US010198277B2

(12) United States Patent
Cattaneo

(10) Patent No.: US 10,198,277 B2
(45) Date of Patent: *Feb. 5, 2019

(54) FACILITATING DEVICE DRIVER INTERACTIONS

(71) Applicant: Amazon Technologies, Inc., Seattle, WA (US)

(72) Inventor: Fiorenzo Cattaneo, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/991,799

(22) Filed: Jan. 8, 2016

(65) Prior Publication Data

US 2016/0124759 A1    May 5, 2016

Related U.S. Application Data

(63) Continuation of application No. 12/414,469, filed on Mar. 30, 2009, now Pat. No. 9,256,440.

(51) Int. Cl.
*G06F 9/445* (2018.01)
*G06F 13/40* (2006.01)
(Continued)

(52) U.S. Cl.
CPC ........ *G06F 9/44505* (2013.01); *G06F 9/4411* (2013.01); *G06F 13/4027* (2013.01); *G06F 9/54* (2013.01)

(58) Field of Classification Search
None
See application file for complete search history.

(56) References Cited

U.S. PATENT DOCUMENTS 6,658,489 B1    12/2003 Asselin
7,082,598 B1 *   7/2006 Le ......................... G06F 9/4413
                                                                703/21
(Continued)

FOREIGN PATENT DOCUMENTS

WO          9939254 A2    5/1999
WO    WO 9939254 A2 *    8/1999    ........... G06F 13/102

OTHER PUBLICATIONS

"Driver Wrapper," retrieved on Jan. 27, 2009, from http://en.wikipedia.org/wiki/Device_driver_wrapper, 1 page.
(Continued)

*Primary Examiner* — Umut Onat
(74) *Attorney, Agent, or Firm* — Robert C. Kowert; Meyertons, Hood, Kivlin, Kowert & Goetzel, P.C.

(57) ABSTRACT

Techniques are described for facilitating interactions with device driver modules. In at least some situations, the techniques include managing interactions between device driver modules and other programs or hardware devices so as to minimize disruptions related to the device driver modules, including when changes to existing device driver modules are made. Such device driver module changes may have various forms and may occur for various reasons, including to install new versions of device driver modules or otherwise upgrade existing device driver modules. Furthermore, the interactions with device driver modules may be managed in various manners, including to allow changes to occur to a device driver module while that device driver module is in use on a computing system, but without causing other programs on the computing system to be restarted or to lose existing connections to the device driver module being changed.

20 Claims, 8 Drawing Sheets

(51) Int. Cl.
*G06F 9/4401* (2018.01)
*G06F 9/54* (2006.01)

(56) References Cited

U.S. PATENT DOCUMENTS

| | | | | |
|---|---|---|---|---|
| 9,218,128 B1* | 12/2015 | Yuschik | ............... | G09B 5/06 |
| 9,256,440 B1* | 2/2016 | Cattaneo | ............... | G06F 9/4411 |
| 2006/0070089 A1* | 3/2006 | Shoaib | ............... | G06F 9/4411 |
| | | | | 719/321 |
| 2009/0089815 A1 | 4/2009 | Manczak et al. | | |
| 2009/0150909 A1* | 6/2009 | Barreto | ............... | G06F 9/4411 |
| | | | | 719/324 |

OTHER PUBLICATIONS

Red Hat GFS 5.2.1.—Administrator's Guide, Chapter 11, "Using GNBD," 2004 Red Hat, Inc., Raleigh, North Carolina, 7 pages.

* cited by examiner

FACILITATING DEVICE DRIVER INTERACTIONS

This application is a continuation of U.S. patent Ser. No. 12/414,469, filed Mar. 30, 2009 and entitled "Facilitating Device Driver Interactions," now U.S. Pat. No. 9,256,440.

BACKGROUND

A device driver module on a computing system may be changed for various reasons, but making modifications to an existing device driver module that is in use can be very disruptive, such as by causing other programs to have to be restarted, or in some cases causing a reboot of the computing system. In addition, the advent of virtualization technologies for commodity hardware has introduced further related problems, including when multiple different programs share access to individual hardware devices and other hardware resource, and that access is disrupted due to a change of a corresponding device driver module. Nonetheless, virtualization technologies, such as those provided by XEN, VMWare, or User-Mode Linux, also provide some benefits with respect to allowing various computing resources to be efficiently and securely shared between multiple users and programs. For example, virtualization technologies may allow a single physical computing system to be shared among multiple users by providing each user with one or more virtual machines hosted by the single physical computing system, with each such virtual machine being a software simulation acting as a distinct logical computing system that provides users with the illusion that they are the sole operators and administrators of a given hardware computing resource, while also providing application isolation and security among the various virtual machines.

DETAILED DESCRIPTION

Figure 1A:
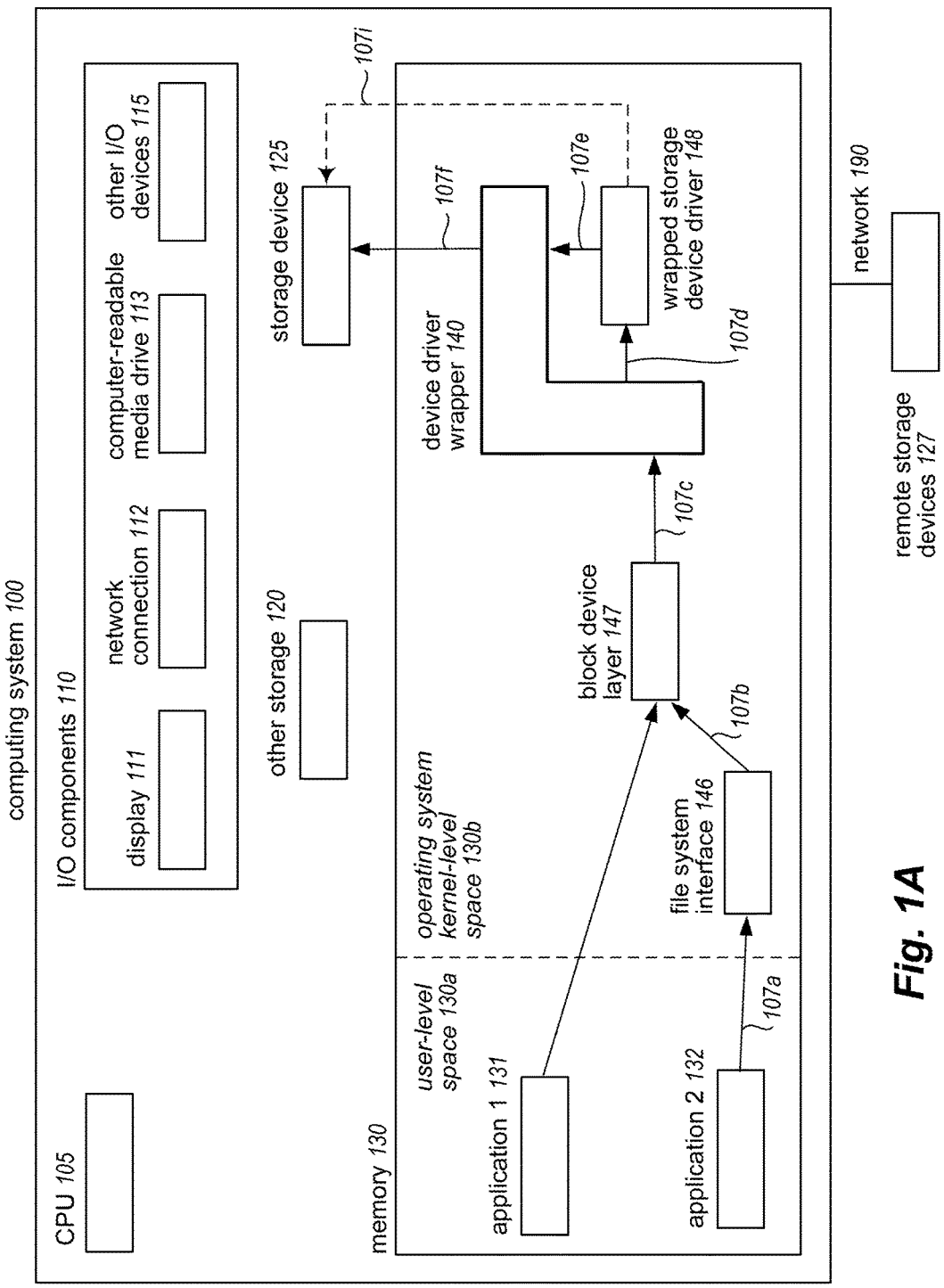
FIGS. 1A-1D illustrate examples of using a device driver wrapper module to facilitate interactions with device driver modules.

Techniques are described for facilitating interactions with device driver modules. In at least some embodiments, the techniques include managing interactions with device driver modules by other programs or hardware devices so as to minimize disruptions related to the device driver modules, including when changes are made to existing device driver modules that are in use. Such device driver module changes may have various forms and may occur for various reasons, including as part of installing new versions of device driver modules or otherwise upgrading existing device driver modules, as discussed in greater detail below. Furthermore, the interactions with device driver modules may be managed in various manners, including to allow changes to occur to a device driver module while that device driver module is in use by one or more other programs on a computing system, but without causing the other programs to be restarted or to lose existing connections to the device driver module being changed, as discussed in greater detail below. At least some of the described techniques for facilitating device driver interactions may be automatically performed in at least some embodiments by a device driver wrapper module, as described below.

Device driver modules that are managed by the described techniques may be of various types in various embodiments, and as previously noted, device driver module changes may occur for various reasons. For example, in some embodiments, some or all of the device driver modules that are managed may be storage device drivers associated with non-sequential and/or sequential hardware storage devices (e.g., hard disk drives, magnetic tape drives, optical disk drives, flash memory drives, etc.), while in other embodiments some or all of the device driver modules may be associated with other types of devices for which state information is maintained (e.g., video cards and other graphic devices, network interface cards and other network adapters, printers, virtual storage devices, other virtual devices, etc.). In addition, in some embodiments, a first device driver module associated with a particular hardware device may be replaced with or otherwise changed to a second device driver module that is also associated with that same hardware device, but that includes different functionality than the first device driver, such as if the second device driver is a newer version of the first device driver or otherwise fixes bugs in or upgrades the first device driver (e.g., to fix bugs in the first device driver, to fix bugs in firmware or microcode of the associated hardware device, etc.). Furthermore, in some embodiments, a second device driver module that replaces a first device driver module may further implement other types of changes, such as to be associated with a different hardware device than the first device driver (e.g., a hardware device of a different type, such as if the first device driver is associated with a first type of non-sequential hardware storage device and the second device driver is associated with a second type of non-sequential or sequential hardware storage device).

In addition, as previously noted, the interactions with device driver modules may be managed in various manners in various embodiments. For example, a device driver wrapper module is used in some embodiments to manage interactions on behalf of an associated device driver module, including to support changes to the associated device driver. In particular, other programs may desire to establish handles or other persistent references to a particular device driver module, and then use those open persistent references to send I/O ("input/output") operation requests or other communications to that particular device driver—such other programs may include, for example, application programs, other device driver modules or other operating system kernel-level modules, etc. However, if such persistent references are established to a particular device driver module, and that device driver module needs to later be unloaded from memory or otherwise modified, execution of those other programs may need to be terminated. Thus, to prevent such problems, a device driver wrapper module instead may be installed or otherwise registered in place of a particular associated device driver module associated with a particular hardware device, such as by using the name that the associated device driver module would otherwise use, or by otherwise registering the wrapper module as being the primary device driver module for the particular hardware device. After such installation or other registration of the device driver wrapper module, other programs that attempt to establish a persistent reference to the associated device driver module (or to whichever device driver module is associated with a particular hardware device that the associated device driver module is configured to support) will instead receive a persistent reference to the device driver wrapper module, and in some or all embodiments the other programs will be unaware that the persistent reference is not directly associated with the associated device driver module. With the persistent references being established to the device driver wrapper module, changes to the associated device driver module do not cause those persistent references to be invalidated, or otherwise necessitate that the persistent references be changed or modified, thus minimizing disruptions to the other programs that are using the persistent references.

When a device driver wrapper module operates in place of an associated device driver module, the device driver wrapper module may manage interactions with the associated device driver in various manners. For example, the device driver wrapper module may attach and wrap the associated device driver in such a manner that all interactions to and from the associated device driver to access functionality of the associated device driver first pass through and are managed by the device driver wrapper module. Such attaching and wrapping operations may involve various actions by the device driver wrapper module, such as registering one or more callbacks with the associated device driver module so that particular communications sent by the associated device driver module are received by the device driver wrapper module. In addition, the device driver wrapper module may implement the same external interfaces (e.g., ioctls, or input/output controls; device I/O controls; data read/write operations and other I/O operations; etc.) as the associated device driver module that it wraps, to enable the device driver wrapper module to receive and forward communications sent to the associated device driver. The device driver wrapper module may further take steps to maintain and use various state information on behalf of the associated device driver module in at least some embodiments, such as application state information about I/O requests and other communications received from other application programs, operating system modules or other programs via established persistent references to the device driver wrapper module and/or device state information about a connection to or other state of a particular hardware device that the associated device driver module is configured to support, as described in greater detail below. In addition, in some embodiments and situations, the device driver wrapper module may take further actions to support particular types of changes in a new attached second device driver module that replaces a previously attached first device driver module. For example, such changes may include a version change in a second device driver module that causes the second device driver module to use different data structures or otherwise receive or send communications in a different manner than the prior version, or changes that reflect differences in interacting with a second hardware device associated with the second device driver module that is different from a first hardware device associated with the first device driver module (e.g., to accommodate different types of hardware devices).

In addition, a device driver wrapper module may have various forms in various embodiments. For example, in some embodiments, a device driver wrapper module may be implemented as a loadable kernel module, a user-level device driver program, or otherwise as a device driver module to be executed by an operating system. In addition, the loading of a device driver wrapper module may be triggered in various manners, such as to occur automatically as part of the boot process for the computing system on which the device driver wrapper module is loaded (e.g., as loaded by the operating system kernel after it is loaded, by being included as part of the operating system kernel that is initially loaded during the boot process, etc.), in response to an instruction from a human user, in response to a request from another program for a persistent reference to the device driver wrapper module or to otherwise use the device driver wrapper module, etc. Furthermore, in some embodiments, each device driver module that is to be attached and wrapped may have a distinct associated device driver wrapper module (e.g., a wrapper module that is configured to support the same interfaces as the wrapped device driver module), while in other embodiments a single device driver wrapper module may be configured to be able to consecutively or simultaneously attach and wrap multiple distinct device driver modules (e.g., multiple programs of a single type of device driver) and/or multiple distinct types of device driver modules. In at least some embodiments, a device driver wrapper module may also be configured to attach and wrap a device driver module that is part of the root file system and/or the boot file system or partition (e.g., a storage device driver for a hardware storage device that stores the root file system and/or the boot file system or partition) or otherwise part of the boot sequence, so at to enable the device driver module's upgrade or other modification without rebooting a computing system.

For illustrative purposes, some embodiments are described below in which specific types of changes to specific types of device driver modules are managed in specific ways so as to facilitate specific types of interactions with the device driver modules. For example, in at least illustrative embodiments, a device driver wrapper module wraps one or more storage device driver modules, and may receive communications for the wrapped storage device driver module(s) that are sent via a block device layer of the operating system. These examples are provided for illustrative purposes and are simplified for the sake of brevity, and the inventive techniques may be used in a wide variety of other situations, some of which are discussed below, with the techniques not being limited to use with storage device drivers, local storage devices, virtual machines, data centers or other specific types of data storage systems, computing systems or computing system arrangements. For example, as noted in greater detail elsewhere, a device driver wrapper module may wrap one or more device driver modules of types other than storage device drivers, and if so may receive communications for the wrapped device driver module(s) that are sent via corresponding layers of the operating system other than a block device layer. In addition, in some embodiments, particular device driver modules and/or device driver wrapper modules may execute in user-level memory space rather than operating system or kernel-level memory space.

FIGS. 1A-1D illustrate examples in which an embodiment of a device driver wrapper module may execute, as well as examples of interactions in which the device driver wrapper module may engage. In particular, in the example of FIG. 1A, a computing system 100 is executing an embodiment of a device driver wrapper module 140 to provide enhanced functionality to applications and other modules on the computing system 100, although in other embodiments a device driver wrapper module may instead support applications and other modules on one or more other computing systems that are remote from computing system 100. In this example, computing system 100 includes a CPU 105, a local storage device 125 and optionally other storage 120, memory 130, and various I/O ("input/output") components 110, with the illustrated I/O components 110 in this example including a display device 111, a network connection component 112 (e.g., a network interface controller card), one or more computer-readable media drives 113, and other I/O devices 115 (e.g., a keyboard, mouse, speakers, microphone, etc.).

In this example, the memory 130 is divided into two portions, a user-level space 130a in which application programs execute, and an operating system space 130b in which the operating system kernel and optionally other parts of the operating system execute. Two applications are executing in the user-level space 130a in this example, those being application 1 131 and application 2 132. The embodiment of the device driver wrapper module 140 is executing in the kernel space 130b in this example, as is a storage device driver 148, a file system interface module 146, and a block device layer module 147. In this example, the storage device driver 148 corresponds to the local hardware storage device 125 (e.g., a hard disk drive), and the device driver wrapper module 140 has previously attached and wrapped the storage device driver 148, such as by establishing connections 107d and 107e via which the device driver wrapper module 140 and wrapped storage device driver 148 may interact. In addition, the device driver wrapper module 140 has further established a persistent connection 107f to the local storage device 125 to enable interactions with the local storage device on behalf of the wrapped storage device driver module 148. However, in other embodiments and situations, the wrapped device driver module may instead interact directly with the associated hardware device, such as via optional connection 107i, whether instead of or in addition to via connections 107e and 107f.

In this example, application 2 desires to perform interactions with a file system (not shown) that is implemented on local storage device 125, and thus initiates a connection 107a to the file system interface 146 provided by the operating system, such as via an open handle or other persistent reference. The file system interface 146 further has established an open handle or other persistent reference 107b to the block device layer module 147, such that file system I/O requests from application 2 using the persistent reference 107a pass through the file system interface 146 and to the block device layer 147. Furthermore, the block device layer 147 has established an open handle or other persistent reference 107c to enable it to pass block I/O data operation requests to the local storage device 125. In particular, the block device layer 147 has established the persistent reference 107c with what it believes to be the storage device driver 148 that corresponds to the local storage device 125. However, the device driver wrapper module 140 has previously taken the place of the wrapped storage device driver 148 with respect to such interactions, and thus the persistent reference 107c from the block device layer 147 is instead established with the device driver wrapper module 140. Accordingly, when the block device layer 147 receives a request from application 2 via the file system interface 146, the block device layer 147 forwards a corresponding block I/O data operation request to the device driver wrapper module 140 via the persistent reference 107c. The device driver wrapper module 140 in turn forwards the received request to the wrapped storage device driver 148 via the connection 107d, and may optionally modify various state information (not shown) that the device driver wrapper module 140 maintains to reflect the operation initiated by application 2.

When the wrapped storage device driver 148 receives the block I/O data operation request from the device driver wrapper module 140, it proceeds to initiate a corresponding interaction via the connection 107e with what it believes to be the local storage device 125. However, in a manner similar to the request sent by the block device layer 147, the device driver wrapper module 140 instead intercepts the communication sent via the connection 107e, and forwards the communication on as appropriate to the local storage device 125 via the connection 107f. In this manner, the device driver wrapper module 140 acts as an intermediary that represents the wrapped storage device driver 148 to the other modules and devices, and interacts with them on behalf of the wrapped storage device driver 148, although in other embodiments the wrapped storage device driver 148 may instead interact directly with the local storage device 125 via optional connection 107i. In addition, it will be appreciated that responses to I/O requests, as well as interrupts or other information, may be received in an opposite direction to that illustrated, such as with a read I/O operation from application 2 resulting in the local storage device 125 passing data back to the device driver wrapper module 140 via the connection 107f, and with that data similarly being passed via the connections 107e, 107d, 107c, 107b, and 107a to application 2 (or with connection 107i used instead of 107f and 107e).

In addition, FIG. 1A further illustrates that in some embodiments and situations, some applications may interact directly with the block device layer 147 without interacting with the file system interface 146, such as if application 1 is, for example, a database server program. If so, I/O requests initiated by application 1 to the block device layer module 147 will be handled in the same manner as previously described with respect to application 2, other than not being passed through the file system interface 146 and corresponding connections 107a and 107b. While two applications are illustrated here as interacting with the device driver wrapper module 140 via the block device layer 147, it will be appreciated that in other embodiments the interactions may occur in other manners, such as with different numbers of application programs (e.g., zero, one, three, etc.), with application programs interacting directly with the device driver wrapper module 140, etc.

Furthermore, while the wrapped device driver module in this example is a storage device driver associated with a local storage device, it will be appreciated that the wrapped device driver module may have other forms in other embodiments and situations, such as the following non-exclusive list: a storage device driver configured to support a remote storage device 127 (e.g., a storage device local to another remote computing system, a network storage device, a device on a storage area network, etc.) over a network 190; a storage device driver configured to support a different local storage device, such as a virtual or non-virtual other storage device 120; a graphics device driver, such as for display 111; a network connection driver, such as for network connection 112 (e.g., to manage communications over network 190); a computer-readable media drive driver, such as for computer-readable media drive; etc.

It will be appreciated that computing system 100 is merely illustrative and not intended to limit the scope of the present invention. For example, computing system 100 may be connected to other devices that are not illustrated, including through network 190 and/or one or more other networks, such as the Internet or via the World Wide Web ("Web"). More generally, a computing system or other computing device may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated module 140 may in some embodiments be distributed in additional modules. Similarly, in some embodiments, some of the functionality of module 140 may not be provided and/or other additional functionality may be available. For example, in the illustrated embodiment of FIG. 1A, the functionality of the device driver wrapper module 140 is provided without modifying other parts of the operating system such as block device layer 147, and in some embodiments without modifying the wrapped device driver module 148. As one alternative, in some embodiments the functionality of the device driver wrapper module may be built into an operating system, thus enabling some or all of the functionality of the device driver wrapper module to be simultaneously provided to multiple device driver modules. For example, if the functionality of the device driver wrapper module is merged with other functionality of block device layer 147, the device driver wrapper module functionality may be provided by the modified layer 147 to some or all of multiple block device driver modules loaded in the operating system (not shown in FIG. 1A), or similarly may be provided as part of other modules of the operating system with corresponding functionality provided to other types of device driver modules.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules may execute in memory on another device and communicate with the illustrated computing systems via inter-computer communication. Furthermore, in some embodiments, some or all of the modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules and data structures may also be stored (e.g., as software instructions or structured data) on a computer-readable medium, such as a hard disk, a memory, a network, or a portable media article to be read by an appropriate drive or via an appropriate connection. The modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 1B:
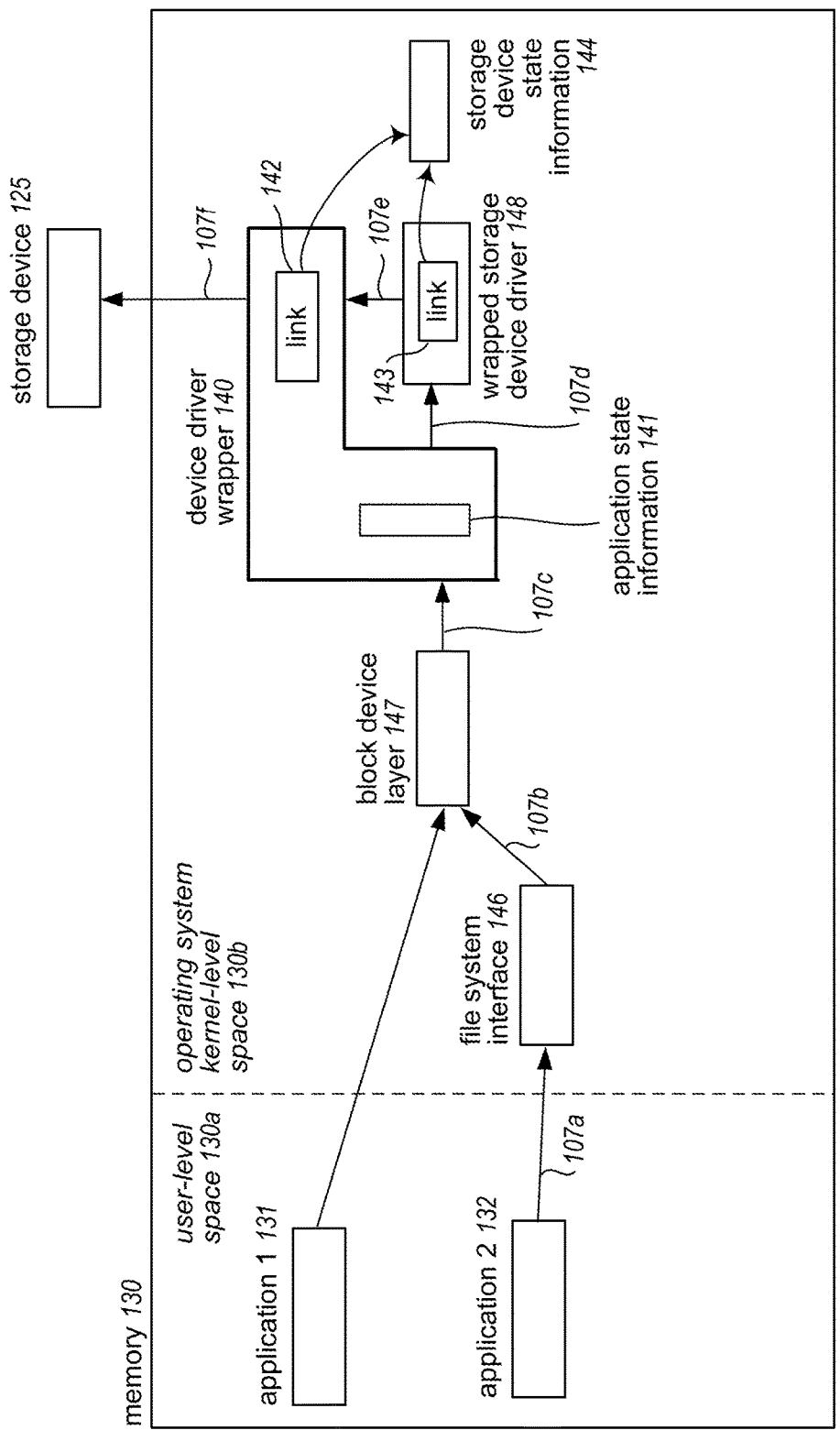

FIG. 1B continues the example of FIG. 1A, with additional details illustrated with respect to the memory 130 and the modules contained within it, but with various of the other components of the computing system 100 external to the memory 130 not illustrated for the sake of brevity. For example, additional details are illustrated in FIG. 1B with respect to state information that is maintained by the device driver wrapper module 140 and the wrapped storage device driver 148. In particular, as the wrapped storage device driver 148 is initialized and performs operations, it maintains various information 144 in memory space 130b that includes information about the storage device 125, such as for use in communicating with the local storage device 125, and maintains a link 143 to that external state information 144. Furthermore, the device driver wrapper module 140 maintains a similar link 142 to that state information 144, such as for use in upgrading or otherwise modifying the particular storage device driver that is attached to and wrapped by the device driver wrapper module 140, as discussed in greater detail with respect to FIGS. 1C and 1D. In addition, as previously noted, the device driver wrapper module 140 may maintain various state information 141 about the applications or other modules with which it interacts, such as application 1, application 2, and/or block device layer 147. For example, the application state information may include a list of all pending I/O operations for each minor device or sub-device corresponding to the storage device driver 148, such as in the form of an I/O queue for each such device. The device state information 144 may have various forms depending on the type of corresponding storage device, such as information about hardware registers and I/O queues of a SCSI controller, or a network socket state of a connection to a remote storage network device. In particular, in some embodiments, the wrapper module 140 may maintain minimal state information that enables a wrapped device driver module to rebuild its own internal state information, such as for use by a newly attached device driver module that replaces a previously attached device driver module that generated that maintained state information, while the wrapped device driver module(s) maintain the logic or other instructions for particular interactions with a corresponding hardware device. In addition, while FIG. 1B does not illustrate the optional connection 107i of FIG. 1A between the wrapped device driver module 148 and the local storage device 125, it will be appreciated that in some embodiments such an optional connection may be provided and used, whether instead of or in addition to connections 107e and 107f.

Figure 1C:
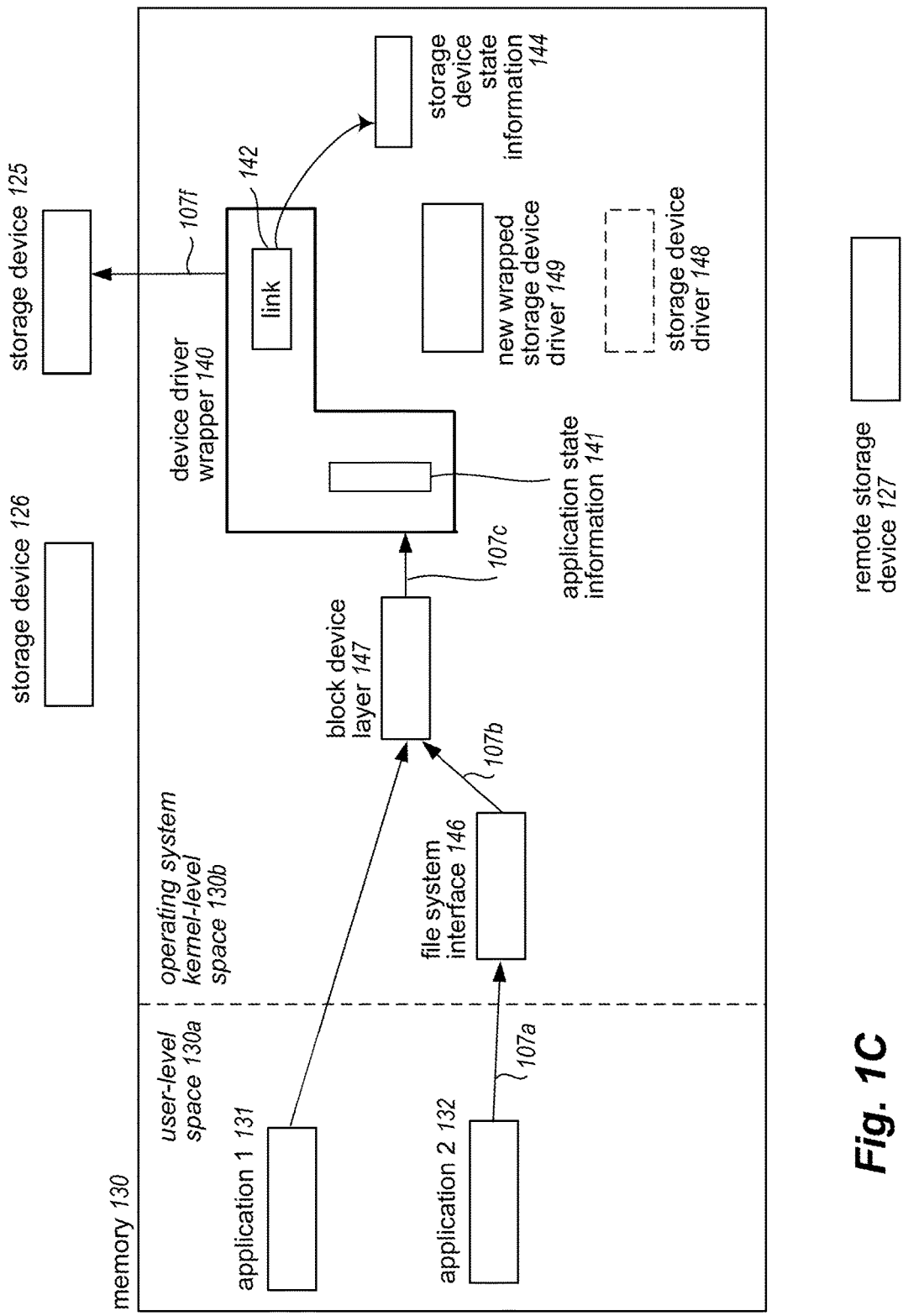

FIG. 1C continues the example of FIG. 1B, and in particular illustrates interactions performed by the device driver wrapper module 140 with respect to modifying the device driver that is attached to and wrapped by the device driver wrapper module 140. In particular, in the example of FIG. 1C, the connections 107d and 107e that were previously illustrated in FIGS. 1A and 1B between the device driver wrapper module 140 and the storage device driver 148 have been severed, and the previously wrapped storage device driver 148 has further optionally had its execution terminated and been unloaded from the operating system memory space 130b. Before terminating the execution of the storage device driver 148, the wrapper module 140 may further instruct the storage device driver 148 to perform appropriate actions, such as to release all resources and update state information 144. In addition, in this example, a new storage device driver 149 to replace device driver 148 has been loaded in the operating system space 130b, but is not yet attached to and wrapped by the device driver wrapper module 140.

Nonetheless, despite device driver 148 being unattached and optionally having its execution terminated, the device driver wrapper module 140 maintains the other information that it previously had used with respect to the wrapped storage device driver 148, including the application state information 141 and the link 142 to the storage device state information 144 that was created by the previously wrapped storage device driver 148. Furthermore, the device driver wrapper module 140 maintains the connections 107*c* and 107*f* with the block device layer module 147 and the local storage device 125, respectively. In this manner, despite the changes in the associated storage device driver that is attached to and wrapped by the device driver wrapper module 140, the connections to other programs and devices remain unchanged. Furthermore, the block device layer 147 and storage device 125 may be unaware that any change has taken place with respect to the attached storage device driver for the device driver wrapper module 140.

In addition, as part of the process of replacing previously attached storage device driver 148 with new storage device driver 149, the device driver wrapper module 140 may have temporarily suspended I/O operation requests and other communications from the block device layer 147 and/or the local storage device 125 while the transition from the previously wrapped storage device driver 148 to the new storage device driver 149 is made. For example, in some embodiments, the wrapper module 140 may send a corresponding communication to block device layer 147 or otherwise to the operating system to temporarily suspend such requests, such as if the operating system supports such temporary suspensions. In other embodiments, such as if the operating system does not support such temporary suspensions, the wrapper module 140 may take other actions to temporarily suspend I/O requests and other communications, such as by receiving and temporarily queuing such communications while the transition takes place.

Furthermore, as discussed in greater detail elsewhere, the new storage device driver 149 may differ from the previously wrapped storage device driver 148 in various manners, such as if it is an upgrade to or different version of the same storage device driver. However, in other embodiments, the change in underlying storage device driver may allow other types of changes to be made, including for the actual underlying storage device to be changed (e.g., to change to another local storage device 126 or instead to a remote storage device 127), with the new storage device driver 149 corresponding to that new storage device. If such a change in underlying storage device is made, however, the device driver wrapper module 140 may have to further change the previously established connection 107*f* to create a new connection to the new storage device that will be used for subsequent interactions, although the connections from and interactions by the applications and the block device layer 147 do not change. In other embodiments, such as when the wrapped device driver module instead maintains and uses an optional direct connection 107*i* to an associated storage device, the wrapped device driver module may instead make the change in the direct connection to the new storage device. In addition, when changing storage devices, the device driver wrapper module 140 may take actions in at least some embodiments to facilitate the change, such as by coordinating the copying of some data from the prior associated storage device to the new storage device, although in other embodiments any such data copying may instead be handled in other manners. Furthermore, while not illustrated here, if the particular storage device to which the device driver wrapper module 140 is connected is changed, the new storage device may in some embodiments be of a different type than the previous storage device (e.g., to change from sequential magnetic tape to a non-sequential hard disk drive), and if so further changes may be made by the wrapper module 140 to support such a change (e.g., by changing or re-initializing the storage device state information 144, by changing aspects of the interface via which particular I/O commands are received from the new storage device driver 149 and passed on to the new storage device, etc.). Similarly, the wrapper module 140 may further make other changes in other situations, including if the new storage device driver 149 uses different data structures or different interfaces or other interaction mechanisms than the previously attached device driver module 148. In some embodiments, the device driver wrapper module 140 may further store version information to reflect a current version of the storage device driver that it attached and wrapped, such as to enable the wrapper module 140 to select from and use different data structures or interaction mechanisms that correspond to the particular storage device driver that is currently wrapped. In addition, as part of attaching new storage device driver 149, various changes may be made to the stored device state information 144 by the wrapper module 140 and/or the new device driver 149, such as to correspond to a version change of the new storage device driver relative to the prior storage device driver. As one example, the new device driver 149 may add statistics collection functionality, and device state information 144 may be modified to include corresponding information (e.g., by appending the new statistics collection information to the end of information 144). Furthermore, if newly attached device driver 149 is instead an older version of previously wrapped device driver 148 (e.g., if device driver 149 was initially attached to wrapper module 140, was replaced with new upgrade attached device driver 148, and then a rollback from new attached device driver 148 to previously attached device driver 149 occurs), corresponding backwards changes to the stored device state information 144 may be made, or instead in some cases the older version device driver 149 may be configured to ignore the additional state information previously added for new version device driver 148.

Figure 1D:
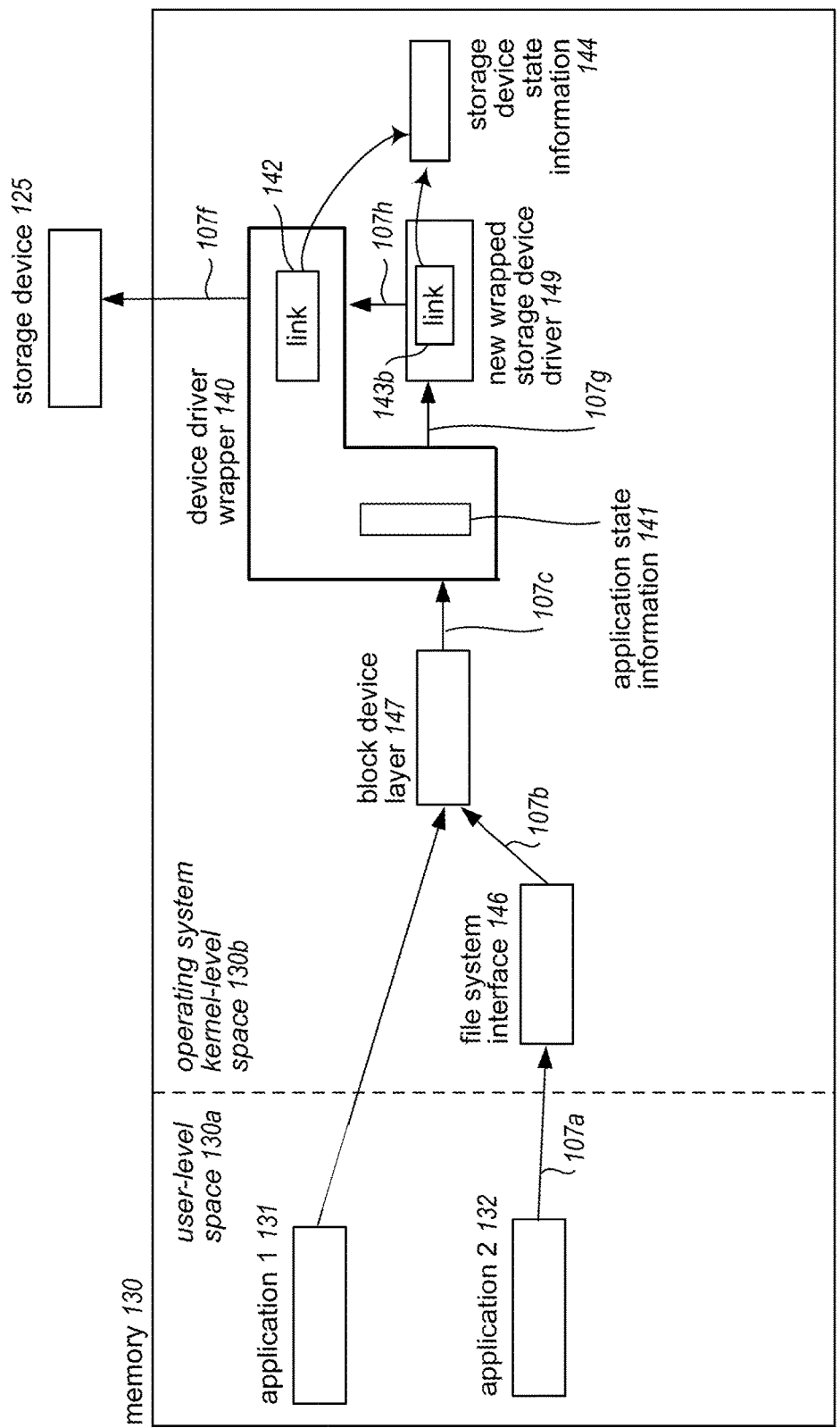

FIG. 1D continues the example of FIG. 1C, and in particular illustrates the situation after the new storage device driver 149 has been attached to and wrapped by the device driver wrapper module 140, such that the suspension of communications from other programs has ended. In particular, in this example, the device driver wrapper module 140 has established new connections 107*g* and 107*h* between it and the new wrapped storage device driver 149, and has further supplied information to the new wrapped storage device driver 149 to enable it to establish a link 143*b* to the previous state information 144. As part of enabling device driver 149 to establish the line 143*b*, the wrapper module 140 may further instruct the storage device driver 149 to perform appropriate actions, such as to rebuild its own internal state from the information 144 and/or information 141. After the new storage device driver 149 is attached and wrapped, the device driver wrapper module 140 may continue to operate in a manner analogous to that previously described in FIG. 1A for the previously wrapped storage device driver 148.

In this manner, the device driver wrapper module 140 facilitates interactions with device drivers by other programs and devices, and enables existing persistent references and other connections to be maintained even when the underlying storage device driver changes.

In addition, as previously noted, in some embodiments the wrapper module 140 may attach and wrap a particular device driver module, so as to enable the wrapper module to receive at least some communications on behalf of the wrapped device driver and/or to perform other actions on behalf of the wrapped device driver. The wrapper module 140 and a wrapped device driver may interact in various manners to support functionality of the wrapper module 140 in at least some embodiments. Examples of particular manners for a wrapper module 140 to attach and detach a wrapped device driver follow, including in which a target device driver to be wrapped cooperates in the attachment and detachment processes (e.g., based on modifications made to the target device driver to support these processes), but in other embodiments such attaching and detaching may be performed in other manners (e.g., without knowledge and/or cooperation of the target device driver to be wrapped).

Example Attach Operation Workflow

A first file handle is created that allows ioctl calls to be made to the device driver wrapper module, such as by opening an operating system control path for the wrapper module (e.g., using /dev/gnbd_wrapper_ctl). A second file handle is then created that allows ioctl calls to be made to a target device driver module to be wrapped, such as by opening an operating system control path for the target device driver (e.g., using /dev/gnbd_wrapped_ctl). An attach utility of the wrapper module then makes a WRAPPED_DEVICE_ATTACH ioctl call to the target device driver, as discussed below, passing to it the first handle to the wrapper module. When the target device driver receives that ioctl call, it converts the first handle to an internal callback pointer (e.g., in a manner specific to the operating system), referred to in the example below as the "ep" pointer, which it then uses to make direct ioctl calls to the wrapper module. The interaction then proceeds as follows, with some minor details omitted for the sake of clarity, as will be appreciated by one of ordinary skill in the art.

- initialize underlying hardware device if any (and/or perform any other device-specific operations, such as setting up network connections to a remote device);
- call a provided EWRAPPER_DEVICE_INTERNAL_IS_EWRAPPER ioctl, as discussed below, to ensure that the ep internal pointer points to the wrapper module;
- call a provided EWRAPPER_DEVICE_INTERNAL_GET_INFO ioctl, as discussed below, to retrieve callbacks to be used by the target device driver;
- increment a device use count for both the wrapper module and the target device driver so that neither will be unloaded;
- allocate memory for internal per-device number ("minor device") structure;
- for each of the device numbers (or minor devices), retrieve a pointer to a portion of the wrapper module that corresponds to the minor device using the ewi_get_device callback, as discussed below;
- initialize device_ioctl and device_request callbacks, as discussed below, to enable the wrapper module to call the target device driver when wrapped;
- create external entry points if appropriate (e.g., /proc or /sysfs entry points if the operating systems supports them);
- retrieve a pointer to the target device driver's previous saved state, if applicable, from the wrapper module, and if the saved state has a lower version then the current version of the target device driver, convert the state to the new state layout if appropriate (possibly updating the saved state pointer if the memory is reallocated), and otherwise do nothing;
- initialize data structures for the target device driver (internal data, pointers, queues and hardware state if any, etc.); and
- set the status to ATTACH, completing the wrapping process.

Example Detach Operation Workflow

The interaction proceeds as follows, with some minor details omitted for the sake of clarity, as will be appreciated by one of ordinary skill in the art.

- for each of the device numbers (or minor devices), do the following:
  - quiesce the minor device status by calling ewi_set_quiesced_device, as discussed below; and
  - wait for any currently pending I/O operations to complete;
- deinitialize hardware and/or suspend network connections and/or suspend any in progress I/O data operations if not completed within a timeout period;
- set device state to DETACH by calling ewi_set_detached_device, as discussed below;
- remove all external points, if any;
- if there are I/O operations which were suspended, queue them to the wrapper module by calling ewi_queue_back_request, as discussed below, so that the wrapper module will hold these I/O operations and re-issue them to the wrapped device driver after it is reattached;
- deinitialize the device_ioctl and device_request callbacks, as discussed below, so that the wrapper module is no longer enabled to call the wrapped device driver; and
- cleanup any allocated memory structures and perform other housekeeping operations.

In addition, as previously noted, in some embodiments the wrapper module 140 may implement the same external interface as that of the device driver module(s) that it wraps, so as to enable it to receive communications on behalf of the wrapped device driver module(s), and the wrapper module 140 may optionally further implement one or more additional interfaces to support operations specific to the wrapper module 140 in at least some embodiments. In addition, in some embodiments a wrapped device driver may be specialized or modified to implement particular functionality to assist interactions with a device driver wrapper module. For example, the wrapper module 140 and a wrapped device driver module may use a set of ioctl calls and a set of function API callbacks to communicate with each other, as well a wrapper module data structure which is exposed to the wrapped device driver, so as to enable the wrapper module 140 and a wrapped device driver to interact in various manners to support functionality of the wrapper module. The particular determination of which calls are implemented as ioctl calls and as API callbacks may vary in different embodiments, such as to implement all of the API callbacks as ioctls in some situations (e.g., in the case of a user-level implementation of at least one of the wrapper module 140 and the wrapped device driver module, such as if a particular operating system being used does not allow callbacks between kernel and user-level modules). Non-exclusive examples of functions that may be implemented (e.g., as ioctls, as callbacks that are exported for use by the wrapped device driver, etc.) include the following, although it will be appreciated by one of ordinary skill in the art that other functions may be used and/or that these functions may be implemented in other manners in other embodiments:

Example Loctls Provided by the Device Driver Wrapper Module

EWRAPPER_DEVICE_PRINT—debug ioctl to print the wrapper module state for a given device, such as in the kernel log;

EWRAPPER_DEVICE_NO_OP—debug ioctl to ensure that the wrapper module is answering;

EWRAPPER_DEVICE_INTERNAL_IS_EWRAPPER—returns a "magic number" identifier when called, such as to enable a wrapped device driver to ensure that a file handle passed to it from a user attach program corresponds to the wrapper module; and EWRAPPER_DEVICE_INTERNAL_GET_INFO—internal request made by a wrapped device driver to obtain the callbacks used for attachment and operation, as discussed in greater detail below.

Example Callbacks Provided by the Device Driver Wrapper Module

In this example, these callbacks (which may be obtained by a wrapped device driver using the EWRAPPER_DEVICE_INTERNAL_GET_INFO ioctl, as previously discussed) are used by a wrapped device driver. In other embodiments, these callbacks may instead be implemented as, for example, ioctls that the wrapped device driver may use for the wrapper module.

ewi_get_device—given a device number, it returns a pointer to a wrapper module data structure that contains generic data information, such as may include, but is not limited to, the following: a device I/O queue; an I/O queue count; a status of the wrapper module; a device name; a pointer to saved wrapped device driver state, such as for saving/restoring the device driver state across detach/attach sequences; a version number of the wrapped device driver state; various structures used by the operating system (e.g., callbacks to a higher level block device layer, block device layer data structures associated to the given device, etc.);

ewi_get_devices—obtain the number of devices;

ewi_end_request—instruct the wrapper module to complete a given I/O request with a given I/O status;

ewi_suspend_requests—instruct the wrapper module to suspend I/O requests (e.g., based on the wrapped device driver not being able to accept I/O requests);

ewi_resume_requests—instruct the wrapper module to resume I/O requests (e.g., based on the wrapped device driver being able to accept I/O requests);

ewi_queue_back_request—instruct the wrapper module to queue back the I/O request, such as to queue it back up to a higher layer (e.g., the block device layer) or into its own internal queue;

ewi_set_attached_device—instruct the wrapper module to treat the associated target device driver as being attached, so as to reflect that the target device driver is ready to receive I/O operations, as well as user I/O control requests;

ewi_set_quiesced_device—instruct the wrapper module to fully quiesce the target device driver, such that the wrapper module no longer treats the wrapped device driver as being ready and will hold/suspend pending I/O requests and any other user I/O control requests;

ewi_set_detached_device—instruct the wrapper module to treat the previously wrapped device driver as being detached, so as to reflect that the wrapper module will no longer receive and handle I/O operations and user I/O control requests for the previously wrapped device driver;

ewi_get_class_device_max_callbacks/ewi_class_device_create_callback/ewi_class_device_remove_callback—for operating systems that support /proc or /sysfs semantics of allowing user programs to access/control state of device via file system objects, to create and destroy such objects and associate such objects with a wrapped device driver callback; and ewi_spin_lock/ewi_spin_unlock—instruct the wrapper module to lock/unlock a wrapper module data structure so that the wrapped device driver may exclusively access its fields, such as to serialize access to such fields to ensure that only the wrapped device driver or wrapper driver (but not both) accesses such fields at any given time.

Example Loctls Provided by a Wrapped Device Driver

WRAPPED_DEVICE_ATTACH—instruct the wrapped device driver to attach itself to the wrapper module; and WRAPPED_DEVICE_DETACH—instruct the wrapped device driver to detach itself from the wrapper module.

Example Callbacks Provided by a Wrapped Device Driver wrapped_driver_ioctl—used by the wrapper module to forward user ioctl requests to the wrapped device driver; and wrapped_device_request—used by the wrapper module to forward requests (e.g., block I/O requests, such as read or write operations) to the wrapped device driver, such as part of a "strategy" routine used by some operating systems. In addition, with respect to actions involved in wrapping an attached device driver module, the wrapper module 140 may in some embodiments hold all externally visible state and entry points (e.g., function calls and callbacks), including, for example, open handles, I/O queues, generic device structures, an open count for each minor device, etc. While at least some entry points may in at least some embodiments merely be pass-through functions that call the attached storage device driver module without further action, in some embodiments some entry points may further involve the wrapper module 140 performing additional functionality (e.g., for open/close functions, for which the module 140 may also modify a use count of the wrapper module 140).

In addition, in at least some embodiments, one or more executing device driver wrapper modules on one or more computing systems may be managed from another remote computing system, such as automatically by an executing program on the other computing system and/or manually by a human user interacting with the other computing system. Such management from the remote computing system may include sending instructions to, for example, load or otherwise execute a particular device driver wrapper module, have a particular device driver wrapper module attach and wrap a particular device driver, have a particular device driver wrapper module replace a currently wrapped device driver with a particular other device driver to be attached and wrapped, have a particular device driver wrapper module take particular operations to support a currently wrapped device driver and/or a new device driver to be attached and wrapped (e.g., to modify associated state information maintained by the device driver wrapper module in a particular manner, such as to support a new version of a device driver to be attached and wrapped), etc.

In some embodiments, at least some of the described techniques are performed on behalf of a program execution service that manages execution of multiple programs on behalf of multiple users of the program execution service and/or on behalf of a non-local block data storage service that manages access of executing programs to remote block data storage volumes. In some embodiments, one or both of the services may have groups of multiple co-located physical computing systems in or more geographic locations, such as in one or more geographically distributed data centers, and such a program execution service may execute users' programs on those computing systems. In such embodiments, users of the program execution service (e.g., customers of the program execution service who pay fees to use the program execution service) may execute programs, and users of the block data storage service (e.g., customers of the block data storage service who pay fees to use the block data storage service) may use non-local block data storage volumes provided via the block data storage service. In some situations, a single organization may provide at least some of both program execution service capabilities and block data storage service capabilities (e.g., in an integrated manner, such as part of a single service), while in other embodiments the block data storage service may be provided in environments that do not include a program execution service (e.g., internally to a business or other organization to support operations of the organization). Furthermore, in some embodiments, the program execution service and/or block data storage service may further use some or all of the described techniques as part of executing programs for users and/or as part of providing to executing programs access to remote block data storage volumes, including with respect to managing device drivers corresponding to remote block data storage volumes. Additional details related to examples of use of a program execution service and/or a block data storage service are included in U.S. patent application Ser. No. 11/395,463, filed Mar. 31, 2006 and entitled "Managing Execution Of Programs By Multiple Computing Systems," now U.S. Pat. No. 8,190,682; and in U.S. application Ser. No. 12/188,943, filed Aug. 8, 2008 and entitled "Providing Executing Programs With Reliable Access to Non-Local Block Data Storage," now U.S. Pat. No. 8,015,343; each of which is incorporated herein by reference in its entirety.

In addition, computing system 100 (or other computing system on which an embodiment of the device driver wrapper module executes) may have various forms in various embodiments. Multiple such computing systems may, for example, be co-located in a physical location (e.g., a data center), and at least some of those computing systems may each include sufficient computing resources (e.g., volatile memory, CPU cycles or other CPU usage measure, network bandwidth, swap space, etc.) to execute multiple programs simultaneously. For example, in at least some embodiments, some or all of the computing systems may each host multiple virtual machines that each may execute one or more programs on behalf of a user, with each such host computing system having an executing hypervisor, root partition, Dom0 component or other virtual machine monitor module that manages the virtual machines for that host computing system. In such embodiments, an embodiment of the device driver wrapper module may execute as part of the executing hypervisor or other virtual machine monitor module, as further described with respect to FIG. 2.

Figure 2:
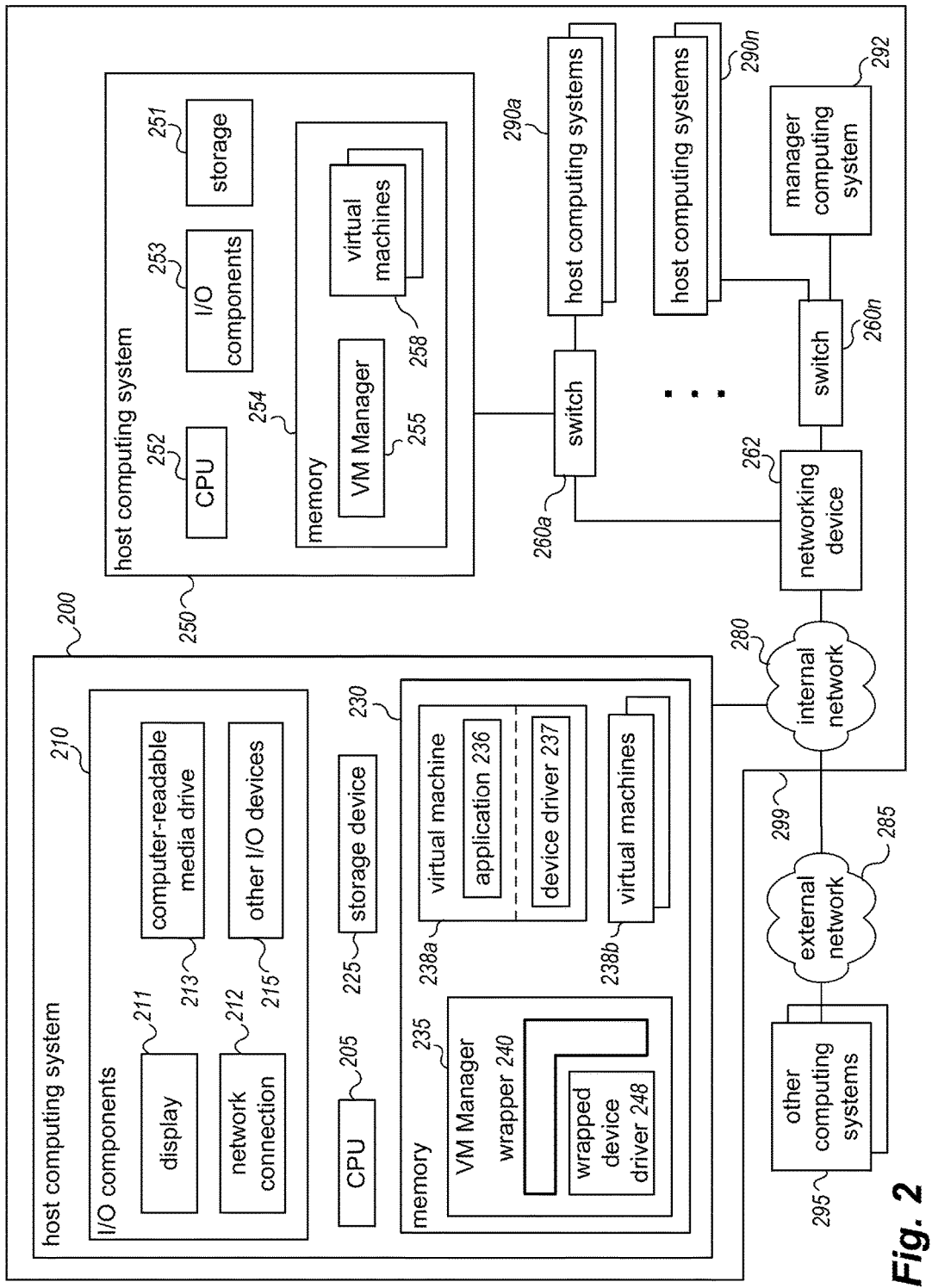
FIG. 2 is a block diagram illustrating example computing systems suitable for executing a device driver wrapper module to facilitate interactions with device driver modules.

FIG. 2 is a block diagram illustrating example computing systems suitable for executing an embodiment of a device driver wrapper module. In particular, FIG. 2 illustrates an example data center 299, such as may be used in some embodiments as part of providing a program execution service or otherwise executing numerous programs. The example data center 299 includes host computing systems 200, 250 and 290 that are each capable of executing user programs, with some details being illustrated only with respect to computing system 200 for the sake of brevity. The host computing systems, as well as an example manager computing system 292 (e.g., to manage operation of the host computing systems, such as on behalf of a program execution service) are connected to one another via an internal network 280 and various networking devices that include an illustrated networking device 262 and network switch devices 260a-260n. The network 280 may, for example, be an interconnection network that joins multiple disparate physical networks within the data center 299 and possibly provides access to external networks and/or systems, such as computing systems 295 (e.g., in one or more other data centers) via external network 285 (e.g., the Internet). In the illustrated example, the networking device 262 provides a gateway between the network 280 and host computing systems 250 and 290a-290n, such as by acting as a router or a bridge.

In this example, at least some of the host computing systems 200, 250 and 290 are each configured to host multiple virtual machines that may each execute one or more programs, and further to use one or more device driver wrapper modules and the described techniques to provide enhanced functionality to the various executing programs. For example, with respect to host computing system 200, which is shown in additional detail relative to host computing systems 250 and 290a-290n for illustrative purposes, the computing system includes a CPU 205, various I/O components 210, storage device 225, and memory 230 in a manner similar to that of computing system 100 of FIG. 1A. The illustrated I/O components 210 also similarly include a display 211, network connection 212, computer-readable media drive 213, and other I/O devices 215. In addition, the memory 230 is separated into different sections that support multiple virtual machines 238, as well as a virtual machine ("VM") manager module 235 (e.g., a root partition, Dom0 component, or other virtual machine monitor module) to manage the virtual machines 238.

Each of the virtual machines 238 may have a configuration similar to that illustrated for memory 130 with respect to FIGS. 1B-1D, including having a portion of the virtual machine's memory space being a user-level space that executes one or more applications 236 and having another portion being an operating system kernel-level space that executes one or more device drivers 237, such as is shown with respect to example virtual machine 238a. Furthermore, while not illustrated in FIG. 2, each of the virtual machines 238 may similarly have distinct logical devices or components that correspond to some or all of the various components illustrated with respect to computing system 100 of FIG. 1A, such as a logical CPU, various logical I/O components, one or more logical storage devices, etc. While the various virtual machines 238 may each have distinct logical devices and components, the actual functionality corresponding to those logical devices and components may nonetheless be provided by the actual physical devices of host computing system 200, such that the various logical CPUs for the various virtual machines 238 may each correspond to a portion of the actual CPU cycles for CPU 205, and such that various logical local storage devices for the various virtual machines 238 may each correspond to a partition or other subset of the actual local storage device 225 of host computing system 200.

Furthermore, while each of the virtual machines may have one or more device driver modules 237 that correspond to the logical devices and components of that virtual machine, those device driver modules 237 do not interact directly with the actual physical devices and components of host computing system 200 that support those logical devices. Instead, the VM manager module 235 may execute one or more device driver modules that interact directly with the corresponding actual physical devices and components of host computing system 200 on behalf of the various virtual machines 238. In this example, the VM manager module 235 is executing a device driver 248 that may, for example, be a storage device driver that is configured to support and interact with local storage device 225, and the module 235 may further have one or more other device driver modules (not shown) corresponding to other devices of host computing system 200. If the device driver 237 of virtual machine 238*a* is, for example, a logical storage device driver that corresponds to a portion of local storage device 225, the device driver 237 receives I/O operation requests from an application program 236 on virtual machine 238*a*, and performs corresponding interactions with a corresponding storage device driver of the VM manager module 235, such as device driver 248. Those interactions with the corresponding device driver of the VM manager module 235 may be performed in various manners, such as if, for example, virtual machine 238*a* mounts or otherwise is provided with a logical device driver module (e.g., via use of GNBD, or "Global Network Block Device," technology) corresponding to device driver 248. Other virtual machines 238 may similarly have distinct logical storage device drivers that also perform corresponding interactions with the same single storage device driver 248 of the VM manager module 235.

The VM manager module 235 may further execute one or more device driver wrapper modules that each attach and wrap a device driver module loaded in the VM manager module 235, such as device driver module 248, so as to facilitate interactions between the various virtual machines and the wrapped device driver module in a manner similar to that previously described with respect to FIGS. 1A-1D. In particular, in the example of FIG. 2, the host computing system 200 has loaded a device driver wrapper module 240 in the VM manager module 235 portion of memory 230, with the device driver wrapper module currently attached to and wrapping a device driver module 248 that is also executed as part of the VM manager module 235 (e.g., as part of an operating system kernel-level memory space, not shown, of the VM manager module 235). Thus, if multiple of the virtual machines 238 each has a device driver 237 that is represented by and linked to the single device driver 248 in the manager module 235, the device driver wrapper module 240 may intercept any communications received from those various device drivers 237 on the various virtual machines 238 on behalf of various applications 236, and further interact with the local storage device 225 on behalf of the wrapped device driver module 248. In this manner, the device driver wrapper module 240 may make changes to the device driver module 248 in a manner that is transparent to the virtual machines 238 and their applications 236 and device drivers 237, thus preventing disruptions to a large number of distinct applications and device driver modules that would otherwise occur if the device driver module 248 was modified while in use.

In a manner similar to host computing system 200, host computing system 250 includes a CPU 252, I/O components 253, storage 251, and memory 254, although particular I/O components are not illustrated. In addition, the memory 254 includes multiple virtual machines 258 and a VM manager module 255, although the virtual machines 258 and manager module 255 lack some details illustrated with respect to virtual machines 238 and manager module 235 of host computing system 200, including indication of one or more device driver wrapper modules that may be executing as part of manager module 255. Some or all of the other host computing systems 290*a*-290*n* may also include the same or similar components to those of host computing system 200, including to operate multiple virtual machines and one or more device driver wrapper modules as part of a manager module, but those details are not illustrated here for the sake of brevity. In addition, while only a limited number of devices are illustrated in this example, it will be appreciated that in a typical arrangement, data center 299 may include hundreds or thousands of host computing systems such as those illustrated here, organized into a large number of distinct physical networks (e.g., in a hierarchical manner). Furthermore, in a similar manner to that described with respect to FIG. 1A, it will be appreciated that computing systems 200, 250, 290*a*-290*n*, and 292, as well as networking devices 260*a*-260*n* and 262, are merely illustrative and are not intended to limit the scope of the present invention.

Figure 3:
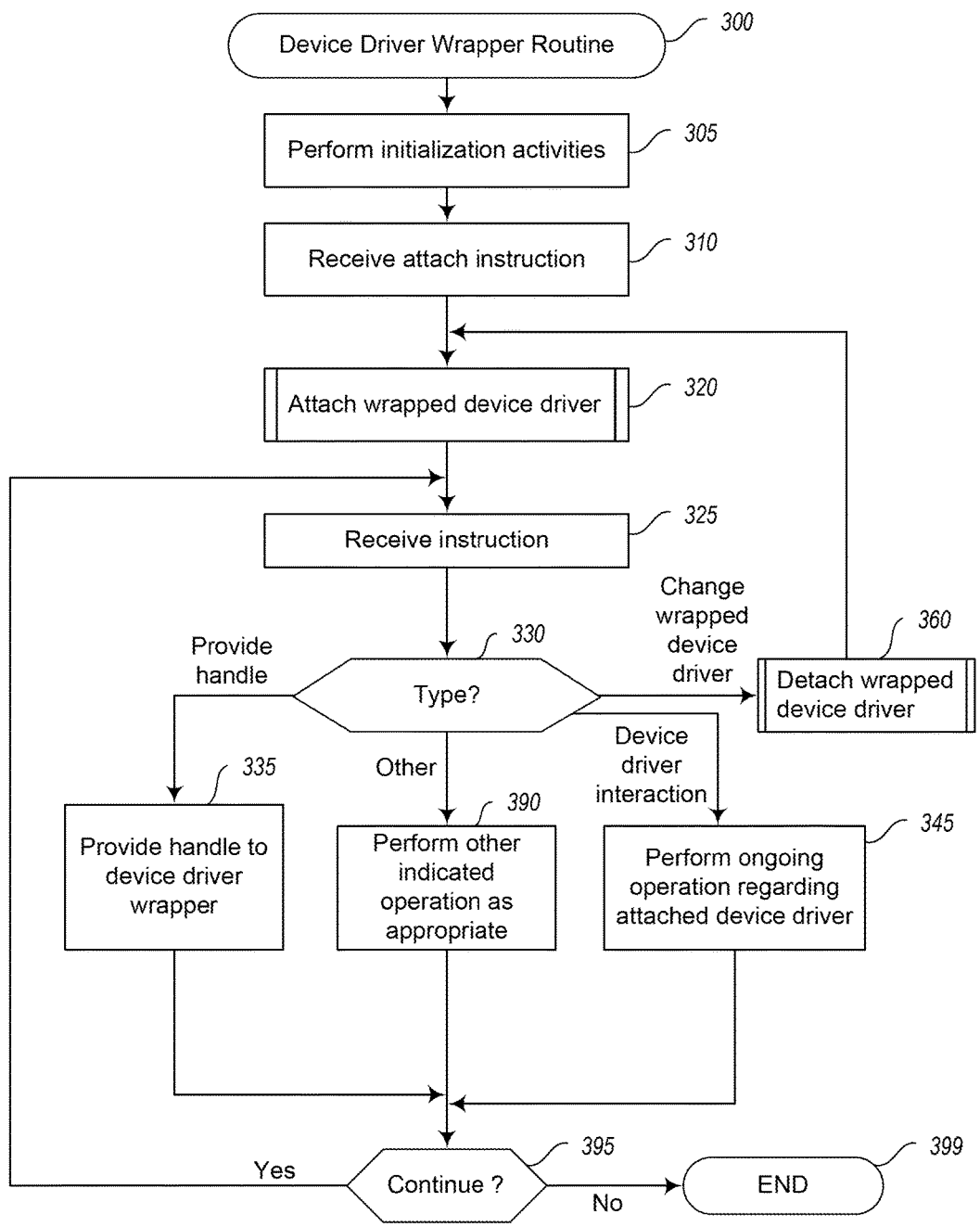
FIG. 3 illustrates a flow diagram of an example embodiment of a Device Driver Wrapper routine.

FIG. 3 is a flow diagram of an example embodiment of a Device Driver Wrapper routine 300. The routine may be provided by, for example, execution of the device driver wrapper module 140 of FIGS. 1A-1D and/or the wrapper module 240 of FIG. 2, such as to facilitate interactions with an attached or otherwise associated device driver module. In the illustrated embodiment, the routine may attach various device drivers of various types at various times, although in other embodiments each device driver module may have a distinct copy of the routine that is specialized for that device driver module.

The illustrated embodiment of the routine begins at block 305, where the routine performs various initialization activities upon being started. As described in greater detail elsewhere, the routine may be initiated in various manners, including by the operating system (e.g., at computer boot time), as requested by a human user, etc. In situations in which the routine is associated with a particular target device driver to be wrapped, the initialization activities may include the routine taking actions to replace that target device driver with respect to further interactions that are initiated by other programs and/or a corresponding associated peripheral device or other hardware device, although in the illustrated embodiment the routine instead performs such activities at the time of attaching a particular target device driver. In addition, if the routine is configured to take the place of a particular device driver, and if the operating system supports such activities, the routine may in block 305 take actions to indicate that the routine is not yet ready to receive I/O requests, such as by providing a corresponding notification to the operating system.

Figure 4:
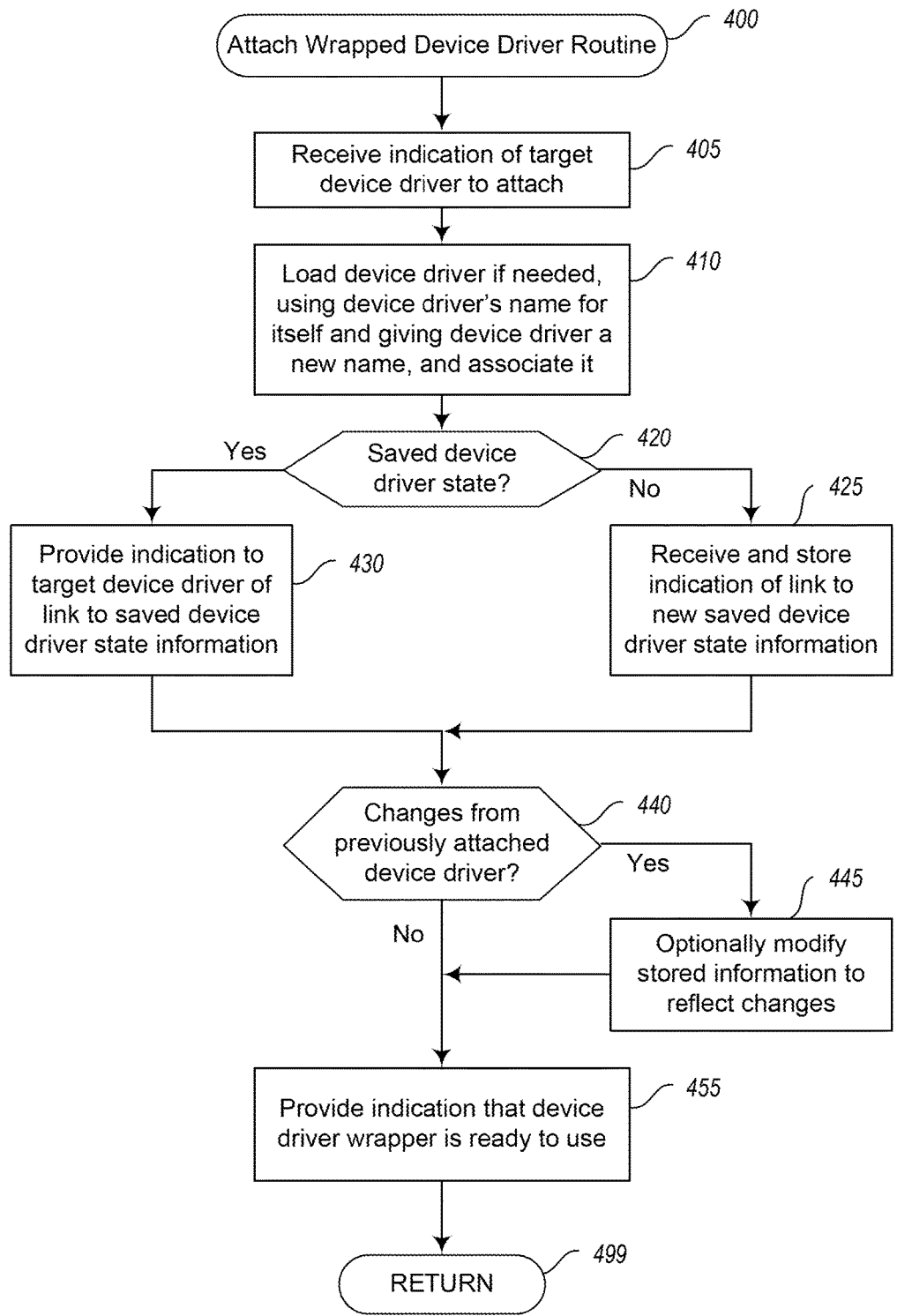
FIG. 4 illustrates a flow diagram of an example embodiment of an Attach Wrapped Device Driver routine.

After block 305, the routine continues to block 310 to wait until an attach instruction is received for a particular target device driver module (e.g., from a human user, immediately in an automated manner if the routine is pre-configured to replace a particular target device driver, etc.). After the attach instruction is received, the routine continues to block 320 to execute a routine to attach and wrap the indicated target device driver, with FIG. 4 illustrating one example of such a routine. After block 320, the routine continues to block 325 to wait for and receive an additional instruction, and in block 330 determines the type of instruction before further proceeding.

In particular, with respect to block 330, if the received instruction is to provide a handle or other persistent reference to the device driver wrapper routine, such as for use by an application program or other device driver module, the routine continues to block 335 to provide such a handle to the requester, and to optionally store application state information to reflect the handle. In other embodiments, such other modules or application programs may obtain handles to the drive driver wrapper routine in other manners that do not involve a response from the routine 300, such as by instead accessing publicly exported handles (if such a feature is supported in the embodiment), interacting with an operating system to receive such a handle, etc.

If it is instead determined in block 330 that the received instruction is a request to perform an I/O operation on behalf of a currently wrapped device driver, the routine continues to block 345 to perform the ongoing I/O operation as appropriate. For example, if the wrapped device driver supports a corresponding hardware storage device, the interaction request may be to read or write a particular block of data, such as if the request is received from a corresponding block device layer module. In performing block 345, the routine 300 may perform various interactions with the wrapped device driver, and may further store various state information with respect to the program from which the request is received or initiated.

Figure 5:
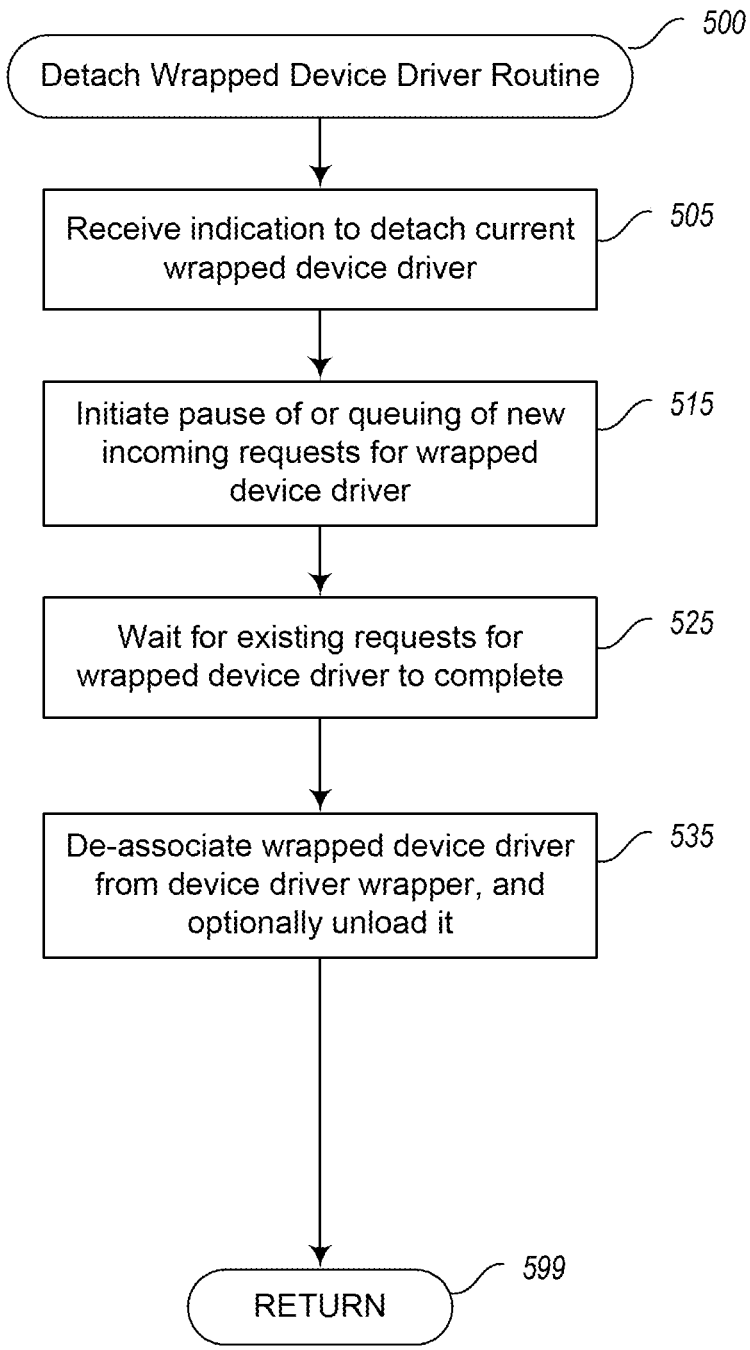
FIG. 5 illustrates a flow diagram of an example embodiment of a Detach Wrapped Device Driver routine.

If it is instead determined in block 330 that the received instruction is to change the current wrapped device driver to a new indicated target device driver, the routine continues to block 360 to perform a routine to detach the current wrapped device driver, with FIG. 5 providing one example of such a routine. After block 360, the routine returns to block 320.

If it instead determined in block 330 that the received instruction is of another type, the routine continues instead to block 390 to perform one or more other indicated operations as appropriate. For example, such other indicated operations may include requests for status information about the device driver wrapper module and/or the current wrapped device driver (e.g., from an administrative user, for an executing program, etc.), indications to perform particular maintenance operations, an indication for the device driver wrapper routine to terminate operation, etc. After blocks 335, 345, and 390, the routine continues to block 395 to determine whether to continue, such as until an explicit indication to terminate is received. If it is determined to continue, the routine returns to block 325, and otherwise continues to block 399 and ends.

FIG. 4 is a flow diagram of an example embodiment of an Attach Wrapped Device Driver routine 400. The routine may be provided by, for example, execution of a device driver wrapper module as previously described with respect to FIG. 3, such as with respect to block 320 of FIG. 3.

In the illustrated embodiment, the routine begins at block 405, where an indication of a particular target device driver module to attach and wrap is indicated. The routine continues block 410 to load the target device driver module if needed, and to configure the device driver wrapper routine to replace the target device driver module with respect to interactions by other programs (e.g., to use the target device driver module's name for itself, while giving the target device driver module a new name to use while wrapped). In other embodiments, a target device driver module may be wrapped even if not currently loaded. In addition, the routine in block 410 attaches the target device driver module with the device driver wrapper in such a manner as to enable to the device driver wrapper module to pass I/O requests to the wrapped target device driver module and to receive response information from the wrapped target device driver module. The routine then continues to block 420 to determine whether device driver state information has been saved with respect to a previously attached device driver module for which the current target device driver module is a replacement, and if so continues to block 430 to provide an indication to the current target device driver module of a link to such saved device driver state information from the previously wrapped target device driver module. Otherwise, the routine continues instead to block 425 to, after the target device driver module indicates an external storage location in which it will save device driver state information, receive and store an indication of a link to that external location.

After blocks 425 and 430, the routine continues to block 440 to determine if the current target device driver module is a replacement for a previously attached device driver module and further includes changes related to how the device driver wrapper routine interacts with the new attached device driver module relative to the previously attached device driver module (e.g., changes to data structures, interfaces or other interaction mechanisms, etc.), such as for a new version of a device driver module that includes one or more upgrades. If so, the routine continues to block 445 to optionally modify any stored information regarding interactions with the previously wrapped device driver module to reflect the changes for the current wrapped target device driver module, and to further store version information or other indications related to the interactions that are to occur for the new attached device driver module. After block 445, or if it was determined in block 440 that there were no such changes to accommodate, the routine continues to block 455 to optionally provide an indication that the device driver wrapper routine is ready to use, such as if the routine was previously indicated to temporarily not be ready (e.g., with respect to block 305 and/or block 360 of FIG. 3). After block 455, the routine continues to block 499 and returns.

FIG. 5 is a flow diagram of an example embodiment of a Detach Wrapped Device Driver routine 500. The routine may be provided by, for example, execution of a device driver wrapper module as previously described with respect to FIG. 3, such as with respect to block 360 of FIG. 3.

The illustrated embodiment of the routine begins at block 505, where an indication is received to detach the current wrapped device driver module. The routine continues to block 515 to initiate a suspension of new incoming requests or other communications for the wrapped device driver module, such as by sending an appropriate indication to the operating system, or to otherwise initiate temporary queuing of new incoming requests until the device driver wrapper routine is ready to receive such requests. The routine then continues to block 525 to wait for any existing I/O requests for the wrapped device driver module to be completed. After block 525, the routine then continues to block 535 to disassociate the wrapped device driver module from the device driver wrapper routine, such as by severing any links or other associations between the device driver wrapper module and the wrapped device driver module. In addition, the routine may optionally unload the previously wrapped device driver module from memory in block 535. After block 535, the routine continues to block 599 and returns.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, in other embodiments the operations may be performed in other orders and in other manners. Similarly, the data structures discussed above may be structured in different manners in other embodiments, such as by having a single data structure split into multiple data structures or by having multiple data structures consolidated into a single data structure, and may store more or less information than is described (e.g., when other illustrated data structures instead lack or include such information respectively, or when the amount or types of information that is stored is altered).

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
   associating, by a computing system, a first device driver with a device driver wrapper that is executing on the computing system, wherein the first device driver is configured to receive communications using a first interface and maintains first state information during operation;
   receiving, by the device driver wrapper, one or more communications that are for the first device driver and that use the first interface, and providing the received one or more communications to the first device driver using the first interface;
   maintaining, by the device driver wrapper, second state information that is associated with operations of the first device driver and is separate from the first state information;
   replacing the first device driver with a second device driver, wherein the second device driver is configured to receive communications using a second interface that is different than the first interface; and
   managing, by the device driver wrapper and based at least in part on the second state information that is associated with the operations of the first device driver, one or more additional communications that use the first interface, including:
      receiving, by the device driver wrapper, the one or more additional communications;
      modifying, by the device driver wrapper, a form of the one or more additional communications that uses the first interface into a different form that uses the second interface; and
      providing, by the device driver wrapper, the one or more additional communications to the second device driver in the modified form that uses the second interface.

2. The computer-implemented method of claim 1 further comprising replacing the second device driver with the first device driver as part of a rollback.

3. The computer-implemented method of claim 1 wherein the receiving of the one or more additional communications includes receiving a first data structure for the first interface, wherein the modifying of the form of the one or more additional communications includes modifying the one or more additional communications to use a second data structure for the second interface, and wherein the providing of the one or more additional communications to the second device driver includes providing the modified one or more additional communications to the second device driver with the second data structure.

4. The computer-implemented method of claim 1 wherein the receiving of the one or more additional communications includes using a first interaction mechanism with the first interface, wherein the modifying of the one or more additional communications includes modifying the one or more additional communications to use a second interaction mechanism with the second interface, and wherein the providing of the one or more additional communications to the second device driver includes providing the modified one or more additional communications to the second device driver using the second interaction mechanism.

5. The computer-implemented method of claim 1 wherein the first interface includes first ioctls (input/output controls) and the second interface includes different second ioctls, and wherein the method further comprises generating, by the device driver wrapper, the modified form of the one or more additional communications by replacing at least one first ioctl in the one or more additional communications with at least one second ioctl.

6. The computer-implemented method of claim 1 wherein the first interface includes first device input/output controls and the second interface includes different second device input/output controls, and wherein the method further comprises generating, by the device driver wrapper, the modified form of the one or more additional communications by replacing at least one first device input/output control in the one or more additional communications with at least one second device input/output control.

7. The computer-implemented method of claim 1 wherein the first interface includes first read/write operations and the second interface includes different second read/write operations, and wherein the method further comprises generating, by the device driver wrapper, the modified form of the one or more additional communications by replacing at least one first read/write operation in the one or more additional communications with at least one second read/write operation.

8. The computer-implemented method of claim 1 further comprising providing, by the computing system and to an executing program, a reference to the device driver wrapper that is used by the executing program in sending the one or more communications and the one or more additional communications, wherein the maintaining of the second state information includes maintaining information about the one or more communications received from the executing program via the provided reference, and wherein the replacing of the first device driver with the second device driver is performed without changing the provided reference.

9. The computer-implemented method of claim 8 wherein the replacing of the first device driver with the second device driver further includes temporarily suspending communications from the executing program during the replacing, and wherein the managing of the one or more additional communications includes updating the second state information based at least in part on the one or more additional communications.

10. The computer-implemented method of claim 1 wherein the second device driver is a different version of the first device driver, wherein the replacing of the first device driver with the second device driver includes configuring the executing device driver wrapper to modify contents of the received one or more additional communications to use the second interface, and wherein the managing of the one or more additional communications includes updating the second state information to indicate the different version for the second device driver and includes storing information corresponding to additional functionality of the second device driver that is not provided by the first device driver.

11. The computer-implemented method of claim 1 wherein the first device driver is configured to interact with a first device of a first type, and wherein the second device driver is configured to interact with a second device of a second type, and wherein the managing of the one or more additional communications includes storing information corresponding to the second type of the second device driver.

12. The computer-implemented method of claim 1 wherein the first and second device drivers are both associated with a single device, wherein the second device driver provides functionality for interacting with the device that is different from functionality provided by the first device driver for interacting with the device, wherein the method further comprises determining to replace the first device driver with the second device driver based at least in part on the different functionality provided by the second device driver, and wherein the managing of the one or more additional communications includes storing information corresponding to the different functionality provided by the second device driver.

13. A non-transitory computer-readable medium having stored contents that cause a computing system to at least:
execute a device driver wrapper to operate in place of a first device driver on the computing system;
receive, by the executing device driver wrapper, one or more communications that are for the first device driver and that use a first data structure, and forward the received one or more communications using the first data structure to the first device driver;
maintain, by the executing device driver wrapper, state information associated with operations of the first device driver, but separate from state information maintained by the first device driver;
replace the first device driver with a second device driver that is configured to use a second data structure that is different than the first data structure; and
manage, by the executing device driver wrapper and based at least in part on the state information that is maintained by the executing device driver wrapper and is associated with the operations of the first device driver, one or more received additional communications that use the first data structure, including to modify a form of the one or more additional communications that uses the first data structure into a different form that uses the second data structure, and to provide the one or more additional communications to the second device driver in the modified form that uses the second data structure.

14. The non-transitory computer-readable medium of claim 13 wherein the device driver wrapper manages interactions with multiple device drivers on the computing system, and wherein the stored contents include software instructions that, when executed, program the computing system.

15. The non-transitory computer-readable medium of claim 13 wherein the stored contents further cause the computing system to modify, by the executing device driver wrapper, the state information to reflect differences between the first and second device drivers, and to provide, by the executing device driver wrapper, the modified state information to the second device driver for use by the second device driver.

16. The non-transitory computer-readable medium of claim 13 wherein the managing of the one or more additional communications by the executing device driver wrapper further includes:
modifying the received one or more additional communications to use an interface that includes use of the second data structure and that the second device driver is configured to support; and
modifying the received one or more communications to use a first interface that the first device driver is configured to support and that is different from the interface supported by the second device driver.

17. The non-transitory computer-readable medium of claim 13 wherein the stored contents further cause the computing system to provide a reference for the device driver wrapper to an executing program, wherein the one or more communications and the one or more additional communications are received via use of the provided reference by the executing program, wherein the maintaining of the state information includes maintaining information about the one or more communications received from the executing program via the provided reference, and wherein the managing of the one or more additional communications includes updating the state information based at least in part on the one or more additional communications, the state information being separate from other state information maintained by the first device driver.

18. A computing system configured to facilitate interactions with device drivers, comprising:
one or more processors;
a first device driver configured to receive communications using a first mechanism;
a second device driver configured to receive communications using a second mechanism that is different than the first mechanism; and
a memory with stored instructions that, when executed by at least one of the one or more processors, cause the computing system to manage interactions with device drivers on the computing system by:
receiving one or more communications via the first mechanism that are intended for the first device driver, and providing the received one or more communications to the first device driver using the first mechanism, wherein the first device driver uses first state information during operation;
maintaining second state information that is associated with operations of the first device driver and is separate from the first state information, and a link to the first state information used by the first device driver;
determining to use the second device driver in place of the first device driver, and using the link to cause third state information used by the second device driver during operation to be updated based at least in part on the first state information; and
managing, based at least in part on the second state information that is associated with operations of the first device driver, one or more additional communications received via the first mechanism, including modifying a manner for providing the one or more additional communications to the second device driver to use the second mechanism instead of the first mechanism, and providing the one or more additional communications to the second device driver in the modified manner using the second mechanism.

19. The computing system of claim 18 wherein the first device driver is configured to use a first interface, wherein the second device driver is configured to use a second interface different from the first interface, and wherein the stored instructions further cause the computing system to generate a modified form of the one or more additional communications that uses the second interface and to use the modified form as part of the providing of the one or more additional communications in the modified manner.

20. The computing system of claim 18 wherein the one or more communications and the one or more additional communications are received from one or more programs executing on the computing system, and wherein the stored instructions further cause the computing system to manage the interactions with the device drivers by providing a device driver wrapper to perform the managing of the interactions, including to perform the using of the link by:
 modifying the first state information to reflect differences between the first device driver and the second device driver; and
 providing the modified state information to the second device driver to use as the third state information, to cause the second device driver to use the third state information.

\* \* \* \* \*